Nov. 20, 1962     A. I. MORGAN, JR., ETAL     3,064,722
PRODUCTION OF CARBOHYDRATES IN READILY DISPERSIBLE FORM
Filed Jan. 11, 1960
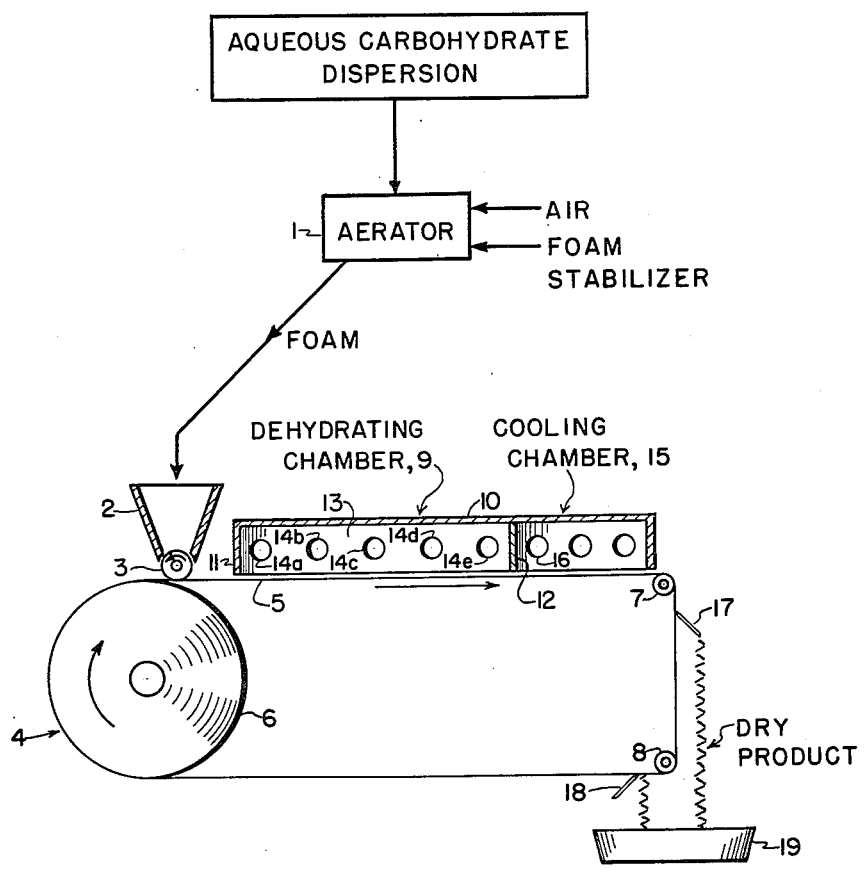
A. I. MORGAN, JR. &
L. F. GINNETTE
INVENTORS 3,064,722
PRODUCTION OF CARBOHYDRATES IN READILY DISPERSIBLE FORM Arthur I. Morgan, Jr., Berkeley, and Lewis F. Ginnette, San Leandro, Calif., assignors to the United States of America as represented by the Secretary of Agriculture Filed Jan. 11, 1960, Ser. No. 1,829
13 Claims. (Cl. 159—49)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for dehydrating aqueous dispersions of carbohydrates. A particular object of the invention is the provision of processes wherein the dehydration is conducted under atmospheric pressure and wherein the solid products produced are porous and can be rapidly and easily dispersed in water for ultimate use. Further objects and advantages of the invention will be apparent from the annexed drawing and the following description, wherein parts and percentages are by weight unless otherwise specified.

The single FIGURE in the annexed drawing depicts schematically a flow sheet of the process of the invention and apparatus with which it may be carried out.

In the preparation of solid products from dispersions of carbohydrates such as corn syrup, molasses, malt syrup, pectin solutions, etc., a prinicpal problem lies in the difficulty of obtaining products which will reconstitute readily. The mere subjection of the liquids to conventional dehydrating conditions such as exposing them to hot air or to the heated surface of a drum dryer will yield products of poor dispersing qualities. Thus, during the drying the product becomes hard and glassy so that it defies dissolution even when stirred with water for long periods of time. Recently it has been shown that certain liquid products can be successfully dried by exposing a layer thereof to vacuum under temperature conditions at which the product remains in a puffed or expanded condition. Although this process yields excellent products, it requires expensive equipment because the drying mechanism must be in a vacuum-tight system and the maintenance of the vacuum by steam ejectors or like during the dehydration involves a considerable expense.

In accordance with the present invention, the dehydration is accomplished under normal (atmospheric) pressure instead of under vacuum. Despite this radical departure, the dehydrated products of the invention are in a porous condition and therefore are rapidly and completely dispersible. Moreover, the dehydration is accomplished without material damage to the chemical composition, color, flavor, and nutritive content of the starting material. Since the dehydration is carried out at normal pressures, relatively inexpensive equipment may be used and operating expenses are minimized.

The objects of the invention are achieved by a procedure which includes these steps:

The starting material—an aqueous dispersion of a carbohydrate—is converted into a stable foam by incorporating therewith a minor proportion of a foam-stabilizing agent and a substantial volume of air or other gas. The foam so produced in the form of a relatively thin layer is then exposed at normal (atmospheric) pressures to a current of a hot gaseous medium until it is dehydrated.

The foam consists of a body of the liquid dispersion throughout which is interspersed a multitude of gas bubbles. The presence of the bubbles gives the foam a volume substantially greater than that of the liquid, per se. During the dehydration step, the mass of foam retains this expanded volume with the result that the final product is a brittle, sponge-like, porous mass consisting of a matrix of solid carbohydrate material in which is interspersed a multitude of voids. This porous mass can be easily crushed to form a product in the form of porous particles. These particles on addition to water form a reconstituted liquid dispersion free from lumps, grit, or other undispersed particles. The fact that the initial liquid is applied to dehydration in the form of a foam and that the volume thereof is essentially maintained during dehydration are keys to the formation of the easily reconstituted porous product. Moreover, by such means the dehydration takes place rapidly and efficiently because moisture can diffuse readily out of the expanded mass.

In preparing the foam, a foam stabilizing agent is added to the liquid starting material and air or other non-toxic gas such as nitrogen, carbon dioxide, nitrous oxide, helium, propane, n-butane, isobutane, dichlorodifluoromethane, trichloromonofluoromethane, trifluoromonochloromethane, etc. is incorporated therein. The chemical nature of the foam stabilizing agent is of no moment to the operability of the invention as long as the agent possesses the ability to stabilize foams. Various examples of suitable agents are listed hereinafter. The proportion of foam stabilizing agent will vary depending on the properties of the liquid starting material, the properties of the agent in question, etc. In general, the proportion of the agent may vary about from 0.1 to 10%, by weight based on the weight of solids in the liquid. It is naturally desirable to use the lowest proportion of foam stabilizing agent compatible with production of a stable foam. Thus in any particular case, pilot trials may be conducted with different proportions of stabilizing agent and noting the stability of the foam after incorporation of gas. The stability of the foams may be easily determined by allowing the test batches of foam to stand at room temperature. A suitably stable foam is one which will retain its volume without any separation of gas from liquid for at least ½ hour, preferably at least one hour, when allowed to stand at room temperature.

Incorporation of the gas into the liquid containing added foam stabilizing agent may be accomplished by any of the conventional methods used for example in aerating ice cream, salad dressings, and the like. A simple and efficacious expedient is to subject the liquid to a rotating wire whip which beats air into the material. Another plan is to pump the liquid through a conduit, a portion of which is of restricted cross-section to form a venturi, the gas being introduced at the zone of high velocity and low pressure within the venturi and so thoroughly commingled with and dispersed into the liquid. For best results, it is preferred that the gas bubbles in the foam be of uniform small size, i.e., about 100 microns or less in diameter. The proportion of gas incorporated into the liquid is generally regulated so that the foam has a volume of at least 1.5 times that of the liquid prior to introduction of the gas. It is usually preferred that the foam have a volume about 2 to 3 times the volume of the liquid to ensure formation of a highly porous dehydrated product. The foam volume may be increased above these levels to obtain even more highly porous products. Usually, however, it is desirable to limit the volume increase to about 5 times the original liquid volume to avoid getting products having too low bulk density. That is, if excessive amounts of gas are added to the liquid the dehydrated products although otherwise completely suitable from the standpoint of rehydration, taste, and color, etc. will require too large a container to package a unit weight of product.

The liquid may be cooled during introduction and dispersion of the gas therein; this generally promotes formation of a stable foam. If cooling is employed, any tem-perature below room temperature may be used provided the mass is not cooled enough to freeze it. Accordingly, temperatures not lower than about 35° F. are recommended.

Having prepared a foam as above described, the foam is spread out in a relatively thin layer and subjected to dehydration at atmospheric pressure by contact with a hot gaseous medium. The thickness of the layer of foam may be varied. Generally, layers about 0.01 to 0.5 inch thick give satisfactory results. The layer of foam may take the form of a continuous web or sheet or of extruded rods having a diameter of about from 0.01 to 0.5 inch. Air is generally used as the gaseous dehydrating medium and excellent results are obtained therewith. However, if desired, oxygen-free gases may be employed to avoid any possibility of oxidation of the product. In such event, one may use inert gases such as nitrogen; carbon dioxide; helium; or combustion gases, for example, the gaseous residue from burning of natural gas containing nitrogen, carbon dioxide, residual methane, etc.

Various types of equipment may be used for the dehydration. For example, one may use a conventional cabinet dryer wherein trays bearing the layer of foam are subjected to a current of hot gaseous medium. The trays may be imperforate or even of screen material if the openings are not over about $1/16$ inch. The foam will not pass through perforations of such screens. Continuous dehydrators of various types may be used, for example, driers equipped with mechanical drive arrangements to move a support bearing a layer of the foam through the apparatus while it is contacted with currents of hot gas moving in concurrent, countercurrent, or cross-wise directions. The drier may be compartmentalized so that the advancing support bearing the foam may be subjected to gas currents at different velocities, temperatures, and directions. A preferred form of continuous drier is described in detail hereinbelow. The dehydration equipment, whether of batch or continuous type, may be provided with infra-red or other radiant heaters to radiate heat directly onto the foam to provide auxiliary heat to the foam during dehydration. For similar purposes, one may provide devices for supplying heat, by radiation or conduction, to the support on which the foam is spread.

In the dehydration, the temeprature of the gaseous medium may range from about 120 to 220° F., the higher temperatures in this range providing more rapid elimination of moisture. As noted hereinabove, a critical feature of the process of the invention is that the volume of the foam is retained during dehydration, thereby the final product is in a porous, easily dispersible form. To ensure such a result, the foam layer may be kept under observation during dehydration and the temperature of the gas reduced if the foam shows a tendency to decrease in volume. Thus, although it is desirable to use a high temperature to obtain a rapid elimination of moisture, the temperature should not be so elevated as to cause any substantial reduction in the volume of the foam. It is impossible to set forth numerical temperature limits in this connection because the stability of the foam will depend on many factors including efficacy of the foam stabilizing agent, temperature of the foam, moisture content of the foam, size of gas bubbles in the foam, rate of heating of the foam, softening temperature of the product, etc. However, in any particular instance the gas temperature may be controlled in accordance with visual observation and this system of control affords a more reliable guide than could numerical limits.

It is evident that during the dehydration the temperature of the product will rise and eventually equal that of the hot gas stream. To avoid possibility of decomposition by the product assuming too high a temperature, it is preferred to lower the gas temperature in the final stage of the dehydration. Thus for example, the gas temperature in the final stage of dehydration may be at a maximum of 120 to 160° F. whereby the product temperature will not rise above these limits.

After carrying out the dehydration as described above there is produced a solid dehydrated product having essentially the same volume as the foam and in a porous, spongy form. The product will generally have a moisture content of about 5%, or less. Generally, it is preferred to cool the dehydrated product before removing it from the tray, belt, or other equipment on which it was dehydrated. The cooling may be effected by contacting the product with a current of cool, preferably dry, air or other gas as exemplified above. Generally, the dehydrated product is cooled to about 70–100° F. and in such condition is especially brittle and easy to remove from the surface on which it is located. The product breaks up on contact with spatulas or scrapers into a mass of flakes or particles. In such form the product is ready for use of packaging, or addition al crumbling to smaller sizes may be needed.

The starting material for the process is an aqueous dispersion of a carbohydrate. The expression "dispersion" is used herein as including true solutions, colloidal solutions, or suspensions. The dispersion may be obtained directly from various sources or may be prepared by dispersing solid carbohydrates in water. The latter method is used when it is desired to convert conventional solid forms of carbohydrates into the porous, readily-dispersible forms described herein. In order to form a stable foam it is necessary that the aqueous dispersion have the requisite body, thus the dispersion should be of a syrupy to pasty consistency. The concentration of carbohydrate solids in the dispersion to afford such consistency will vary widely depending particularly on the molecular weight of the carbohydrate. For example with solutions of low molecular weight carbohydrates such as sucrose, dextrose, invert sugar, maltose, etc. concentrations of at least 20% may be required. On the other hand with high molecular weight carbohydrates such as dextrins, dextrans, pectins, etc., concentrations as low as 1 or 2% may afford the desired syrupy consistency. It is generally preferred to employ aqueous dispersions which have as high a solids content as is compatible with retention of liquid character whereby the proportion of moisture which must be removed in the dehydration step in accordance with the invention is minimized. Depending on the chemical composition of the carbohydrate components, the concentration thereof, the proportion of suspended undissolved solids, etc., the dispersions may range in consistency from syrup to pasty. Any of such preparations are considered as being liquids since they have typical fluid properties. Concentrating procedures such as evaporation may, of course, be applied to the aqueous carbohydrate dispersions to bring them to the proper consistency for producing a stable foam. Evaporation under vacuum at temperatures of 150° F. or below are generally preferred to avoid decomposition or flavor changes.

As noted herinabove, a foam stabilizing agent is incorporated into the aqueous carbohydrate dispersion so as to enable preparation of a stable form. A multitude of such agents are known and the invention encompasses the use of any of them. The foam stabilizer may be a surface active agent or a hydrophilic colloid or a mixture of the two.

Typical examples of classes of surface active agents and individual compounds which may be used are listed below—

Fatty acid monoesters of inner ethers of hexitols, the fatty acids containing at least six carbon atoms. Illustrative of this class are sorbitan monolaurate, sorbitan monomyristate, sorbitan monopalmitate, sorbitan monostearate, sorbitan monooleate, and sorbitan monolinoleate. The corresponding fatty acid esters of mannitan may also be used.

Condensation products of ethylene oxide with sorbitan or mannitan monofatty acid esters. Typical among these compounds are ethylene oxide condensates of sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole of sorbitan monoester.

Condensation products of ethylene oxide with long-chain carboxylic acids, that is, compounds of the formula $$R—CO—(OC_2H_4)_n—OH$$

where R—CO is the acyl radical of a fat acid such as lauric, palmitic, oleic, stearic, etc. and $n$ has a value from 6 to 60.

Condensation products of ethylene oxide with long-chain aliphatic alcohols, i.e., compounds of the formula $$R—(OC_2H_4)_n—OH$$

wherein R is the hydrocarbon radical of a long-chain alcohol such as dodecyl, tetradecyl, hexadecyl, octadecyl, oleyl, etc. and $n$ has a value from 6 to 60.

Mono- or di-esters of sucrose and fatty acids containing at least six carbon atoms. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, and the like.

Monoglycerides of higher fatty acids, for example, glycerol monolaurate, glycerol monomyristate, glycerol monopalmitate, glycerol monostearate, glycerol monooleate.

Salts of higher fatty acids, for example, sodium palmitate, sodium stearate, sodium oleate, or mixtures thereof.

Higher alkyl sulphates, as for example, sodium dodecyl sulphate, sodium tetradecyl sulphate, sodium hexadecyl sulphate, sodium octadecyl sulphate, sodium oleyl sulphate.

Higher alkyl sulphonates, e.g., sodium dodecane sulphonate, sodium tetradecane sulphonate, sodium hexadecane sulphonate, sodium octadecane sulphonate, sodium oleyl sulphonate.

Alkylaryl sulphonates such as the sodium alkyl ($C_8$—$C_{20}$) benzene sulphonates. Typical in this class are sodium dodecyl benzene sulphonate and sodium hexadecyl benzene sulphonate.

Alkyl esters of sulphosuccinic acid, for example, the sodium salt of dioctyl sulphosuccinate.

Sulphonated or sulphated fatty acid esters or amides, i.e., compounds of the types:

$$RCO—O—CH_2—CH_2—SO_3Na$$
$$RCO—NH—CH_2—CH_2SO_3Na$$
$$RCO—O—CH_2—CH_2—OSA_3Na$$

and $$RCO—NH—CH_2—CH_2—OSO_3Na$$

wherein RCO— represents the acyl radical of a long-chain fatty acid such as lauric, myristic, palmitic, stearic, oleic, etc.

Condensates of ethylene oxide and alkyl phenols, that is, compounds of the type: $R—C_6H_4—(OC_2H_4)_nOH$ wherein R represents an alkyl radical containing 6 to 20 carbon atoms and $n$ has a value of about 6 to 30.

Salts of bile acids, for example, bile salts as obtained from animal sources or alkali metal salts of individual bile acids such as cholic acid, dehydrocholic acid, desoxycholic acid, hydrodesoxycholic acid, dehydrodesoxycholic acid, dehydrodesoxycholic acid, lithocholic acid, glycocholic acid, or taurocholic acid.

It will of course be appreciated that the particular surface active agent for use in the process of the invention will be selected according to the use which is to be made of the final product. Thus where the product is intended for edible purposes, the surface active agent selected will be one which is edible or at least which may be ingested without adverse effects. Thus for the production of edible products, we prefer to use surface active agents of the class of fatty acid esters of sorbitan or mannitan, agents of the class of polyoxyethylene sorbitan (or mannitan) fatty acid esters, agents of the class of polyoxyethylene derivatives of higher fatty acids, e.g., polyoxyethylene monostearate, agents of the class of surcose mono- or di-esters with higher fatty acids, agents of the class of glycerol monoesters of higher fatty acid esters, agents of the class of bile salts, etc.

Generally it is preferred to employ surface active agents in order to stabilize the foam for dehydration since these agents are especially effective even when employed in very small proportion, for example, from 0.1 to 2% by weight based on the weight of solids in the starting liquid. However, the foam stabilizer may be a mixture of a surface active agent and a hydrophilic colloid or may be a hydrophilic colloid alone.

Typical examples of hydrophilic colloids which may be employed are: albumin, dried egg-white, dried glucose-free egg white, gelatin, sodium gluten sulphate, sodium gluten phosphate, polyvinylpyrrolidone, polyvinyl alcohol, and the like. Hydrophilic colloids which are themselves carbohydrates may also be used in the process of the invention particularly with aqueous dispersions of the low molecular weight carbohydrates such as sucrose, dextrose, maltose, invert sugar, etc. For this purpose one may use such agents as soluble starch, sodium carboxmethyl cellulose, methyl cellulose, agar, gum tragacanth, gum arabic, gum acacia, gum karaya, carrageen, alginic acid, sodium alginate, pectin, dextran, sodium carboxymethyl starch, sodium carboxymethyl amylose, sodium carboxymethyl amylose, sodium carboxymethyl amylopectin, pentosans, etc. Generally, however, it is preferred to employ as the hydrophilic colloid, water-dispersible proteins such as albumin, dried egg white preparations or the like.

The process of the invention may be utilized for the obtaining in porous form carbohydrates of all types. Thus the starting material may contain any one or a mixture of carbohydrates. Typical of the carbohydrates are sucrose; dextrose; invert sugar; fructose; maltose; lactose; the mixtures of carbohydrates which constitute the solids content of honey, maple syrup, molasses, corn syrup, sorghum syrup, malt syrup, syrups obtained by saccharifying cellulosic materials such as wood, cotton linters, etc.; dextrins; dextrans; starches; di-aldehyde starch; natural gums such as tragacanth, arabic, acacia, locust bean, karaya, carrageen, pectins, algins, low-methoxyl pectins, pectic acids; synthetic gums such as methyl cellulose, carboxymethyl cellulose, carboxymethyl amylose, carboxymethyl amylopectin; pentosans; etc. Although the invention may be applied to carbohydrates of all kinds, it is of particular benefit in dehydrating liquids containing components which because of high molecular weight, admixture of several components, presence of crystallization inhibitors, or other reasons do not form crystalline products. Such liquids include the byproduct syrups such as beet and cane molasses; the syrups obtained in saccharifying starchy or cellulosic materials, i.e., corn syrups, malt syrups, sorghum syrups; and dispersions containing any components that have a pasting or gelling capacity, i.e., starches; natural gums, synthetic gums, dextrans, dextrins, and the like.

The process of the invention is further explained as follows, with reference to the annexed drawing: A liquid carbohydrate dispersion is fed into aerator 1 which may take the form of a conventional device commonly used for aerating ice cream, salad dressings, or the like. Air and a foam stabilizer are likewise fed into aerator 1 to provide a foam of the proper volume and stability. The liquid, now in the form of a foam, is fed into hopper 2 of dehydrator 4.

Dehydrator 4 includes a flexible, endless belt 5 made of elastic material, e.g., glass fibers coated with polytetrafluoroethylene, which is tautly disposed about drum 6 and rollers 7 and 8. Drum 6 is driven by suitable mechanism to continuously traverse belt 5 in the direction shown.

Hopper 2 and driven feed roller 3 extend in width essentially the same distance as the width of belt 5. Roller 3 in cooperation with hopper 2 deposits on belt 5 a thin layer of the foam. By suitable adjustment of the position of hopper 2 and roller 3 above belt 5 and control of the speed of feed roller 3, the foam is deposited in a thin layer on the order of 0.01 to 0.2 inch thick.

The layer of foam on belt 5 is carried through dehydrating chamber 9 wherein it is dehydrated by contact with hot air. Dehydrating chamber 9 takes the form of a bottomless compartment, essentially as wide as belt 5, and is formed by top plate 10, end plates 11 and 12, and side plates 13, only one of the latter being shown in the drawing. Ports 14a, 14b, 14c, 14d, and 14e are provided for introduction of hot air. This hot air flows transversely across the layer of foam causing it to be dehydrated forming a solid, porous product. Ports or other suitable vents are provided in the opposite side wall 13 of chamber 9 not shown in the drawing. It is evident that the length of chamber 9, i.e., the distance from plate 11 to 12 is long enough to permit the layer of foam to be dehydrated in the time of its passage through the chamber. Chamber 9 is not sealed from the atmosphere and the pressure therein is essentially normal atmospheric pressure.

The temperature of the hot air entering dehydrating chamber 9 via ports 14a, 14b, etc., as explained hereinabove is high enough to effectuate a rapid elimination of moisture from the foam yet not so high as to cause any substantial reduction in the volume thereof. The air temperature may be controlled in accordance with visual observation of the material undergoing dehydration and for this purpose, the walls of chamber 9 may be provided with windows, sight glasses, or the like. A metal support for belt 5 may be used between drum 6 and pulley 7. This support may be conductively heated by steam or electricity to provide additional heat to the foam layer from below.

It is evident that as the layer of foam passes through chamber 9, its temperature will rise and eventually equal that of the hot air stream. To minimize alteration of the natural flavor by the product assuming too high a temperature, it is preferred to employ hot air at reduced temperature during the final stages of the dehydration. For example, the air entering adjacent to the exit end of the dehydrating chamber, for instance through ports 14d and 14e may be at a maximum of about 120–160° F. whereby the product temperature will not rise above these limits. Suitable partitions similar to vertical plate 12 may be provided within chamber 9 to delineate the zones having hot air at different temperature levels.

After leaving dehydrating chamber 9, the dehydrated product is next transported by the belt to cooling chamber 15 which is constructed essentially the same as dehydrating chamber 9. Ports 16 are provided to contact the dehydrated product with a current of cool air. Chamber 15 is not sealed from the atmosphere and the pressure therein is essentially normal or atmospheric pressure. The product as it leaves the dehydrating chamber is generally in a plastic state and would be relatively difficult to remove from the belt. By applying cooling the product is put into a brittle state which facilitates its removal from the belt. Air having a low humidity is preferably employed in the cooling step to prevent moisture regain by the dry product. Generally, the volume and temperature of the air circulated through chamber 15 are so regulated to reduce the product to a temperature of 100° F. or below, usually to about room temperature (70° F.).

The cool, dehydrated product is then carried by belt 5 about rollers 7 and 8. These rollers are deliberately of a small size so that the belt is subjected to a sudden change in direction. Belt 5 being of flexible, rubbery material is able to repeatedly negotiate this abrupt turn without damage. However, the cooled, dehydrated product being now in a brittle condition is cracked into pieces and dislodged from the belt as it traverses rollers 7 and 8. The product now in the form of flakes or pellicles falls into receiver vessel 19. Doctor blades 17 and 18, spaced a small distance from the surface of belt 5, assist in freeing the loosened particles of product.

An important feature of the apparatus lies in the method dislodging the dehydrated product from the belt 5. This method involves traversing the belt in a path which involves an abrupt change in direction. As a result the outer fibers of the belt are stretched relative to the inner fibers with the result that the product—being brittle—is cracked into fragments and dislodged from the belt. The desired effect is readily attained by conducting the belt over a guide member—such as a roller—with a change in direction or turn of at least 90°. The thickness of the belt and the radius of the guide member are so correlated that the outer fibers of the belt are elongated at least 5% relative to elongation of the inner fibers—those contacting the guide member. The following formula may be used to obtain the desired correlation:

$$\frac{r+t}{r}=e$$

wherein $r$ is the radius of the guide member, $t$ is the thickness of the belt, and $e$ is the ratio of the elongation of the outer fibers to that of the inner fibers. In using the formula, the values $r$ and $t$ are so chosen that $e$ has a value of 1.05 or more. For example, if the belt is 0.1 inch thick, a guide member having a radius of 2 inches will produce a relative elongation of 1.05, that is, the outer fibers will be stretched 5% more than the inner fibers. A greater degree of stretch, say 10%, would be obtained with the same belt conducted over a guide member having a radius of one inch. Inasmuch as this stretching of the outer fibers of the belt is employed to release the dehydrated product, it is necessary that the belt be made of elastic material so that it may withstand this stress without damage. Use of the above-described method of removing the dehydrated product from the belt offers the particular advantage that the use of belt-contacting scrapers or doctors is eliminated. Such devices rarely give satisfactory results because they score the belt surface and usually leave a thin film of dried material which as it builds up with continued operation interferes with proper operation and may contaminate the product with particles of hard, varnish-like dried material.

The invention is further demonstrated by the following illustrative examples—

*Example I*

The starting material was an aqueous solution containing 5% citrus pectin. Into 100 parts of this solution was incorporated 0.5 part of dried egg albumen. The mixture was foamed by whipping with a power-operated egg beater. A foam having a density of 0.4 gram per ml. was produced. The foam was spread in a layer ⅛" thick on the belt of a belt dryer. The foam was conducted by the belt through the dryer where it was contacted with hot air at 170° F. for a residence time of 50 minutes. The dried product was passed through a 20-mesh screen to form porous particles which were instantly dispersed on spoon stirring in cold water.

*Example II*

The starting material was an equeous solution containing 45% sucrose and 3% pectin. Into 100 parts of this solution was incorporated 0.5 part dried egg albumen. The resulting mixture was foamed and dried as described in Example I. The product dispersed instantly on spoon stirring in water. The product is useful, for example, as a base for dry mixes for preparing of gel—or pudding-type desserts.

*Example III*

Into 100 parts of commercial corn syrup (75% solids) was incorporated 1 part of dried egg albumen. The mixture was foamed and dried as described in Example I. The dried, porous product was instantly rehydratable and did not cake on storage.

*Example IV*

Into 100 parts of honey (80% solids) was incorporated 1 part of dried egg albumen. The mixture was foamed and dried as described in Example I. The dried, porous product was instantly rehydratable.

*Example V*

Into 100 parts of cane molasses (75% solids) was incorporated 1 part of glycerol monostearate. The mixture was foamed and dried as described in Example I. The porous dried product was instantly rehydratable.

Having thus described the invention, what is claimed is:

1. A process for preparing a dehydrated product from an aqueous carbohydrate dispersion which comprises incorporating into the dispersion a gas and a minor proportion of a foam stabilizing agent to form a stable foam, spreading the foam into a relatively thin layer, contacting the layer of foam, at atmospheric pressure, with hot gaseous medium having a temperature, within the range about from 120 to 220° F., insufficiently high to cause the foam to substantially decrease in volume and continuing said contact of the hot gaseous medium with the foam until the foam is dehydrated to a solid, porous, readily dispersible product.

2. A process for preparing a dehydrated product from an aqueous carbohydrate dispersion which comprises incorporating into said dispersion a minor proportion of a foam stabilizing agent, whipping air into the concentrate to form a stable foam, spreading the foam into a relatively thin layer, contacting the layer of foam, at atmospheric pressure, with hot air having a temperature within the range about from 120 to 220° F., insufficiently high to cause the foam to substantially decrease in volume, and continuing said contact of the hot air with the foam until it is dehydrated to a solid, porous readily redispersible product.

3. The process of claim 2 wherein the foam stabilizing agent is a glycerol monoester of a saturated higher fatty acid.

4. The process of claim 2 wherein the foam stabilizing agent is the glycerol monoester of palmitic acid.

5. The process of claim 2 wherein the foam stabilizing agent is the glycerol monoester of stearic acid.

6. The process of claim 2 wherein the foam stabilizing agent is an ester of sucrose and a higher fatty acid.

7. The process of claim 2 wherein the foam stabilizing agent is sucrose dipalmitate.

8. The process of claim 2 wherein the foam stabilizing agent is sucrose monopalmitate.

9. A process for dehydrating an aqueous carbohydrate dispersion which comprises incorporating a foam stabilizer and a gas into the dispersion to produce a foam, continuously applying the foam in the form of a thin layer on a flexible elastic support, continuously transporting said support bearing the layer of foam through a dehydration zone wherein the foam is contacted with hot air having a temperature, within the range about from 120 to 220° F., insufficiently high to cause the foam to decrease in volume and continuing said contact of the hot air with the foam until the foam is dehydrated forming a solid, porous product, continuously transporting said support bearing the layer of dehydrated product through a cooling zone wherein the product is cooled at normal atmospheric pressure to a temperature below 100° F., continuously conducting said support bearing the layer of cooled, dehydrated product in a path which includes an abrupt change in direction whereby the cooled, dehydrated product is broken into pieces and dislodged from the support, and collecting the said product.

10. A process for preparing a dehydrated product from molasses which comprises incorporating into said molasses a gas and a minor proportion of a foam stabilizing agent to form a stable foam, spreading the foam into a relatively thin layer, contacting the layer of foam, at atmospheric pressure, with hot gaseous medium having a temperature, within the range about from 120° to 220° F., insufficiently high to cause the foam to substantially decrease in volume and continuing said contact of the hot gaseous medium with the foam until the foam is dehydrated to a solid, porous, readily dispersible product.

11. A process for preparing a dehydrated product from corn syrup which comprises incorporating into said corn syrup a gas and a minor proportion of a foam stabilizing agent to form a stable foam, spreading the foam into a relatively thin layer, contacting the layer of foam, at atmospheric pressure, with hot gaseous medium having a temperature, within the range about from 120° to 220° F., insufficiently high to cause the foam to substantially decrease in volume and continuing said contact of the hot gaseous medium with the foam until the foam is dehydrated to a solid, porous, readily dispersible product.

12. A process for preparing a dehydrated product from an aqueous dispersion of starch which comprises incorporating into said aqueous dispersion of starch a gas and a minor proportion of a foam stabilizing agent to form a stable foam, spreading the foam into a relatively thin layer, contacting the layer of foam, at atmospheric pressure, with hot gaseous medium having a temperature, within the range about from 120° to 220° F., insufficiently high to cause the foam to substantially decrease in volume and continuing said contact of the hot gaseous medium with the foam until the foam is dehydrated to a solid, porous, readily dispersible product.

13. A process for preparing a dehydrated product from an aqueous dispersion of a carbohydrate gum which comprises incorporating into said aqueous dispersion of a carbohydrate gum a gas and a minor proportion of a foam stabilizing agent to form a stable foam, spreading the foam into a relatively thin layer, contacting the layer of foam, at atmospheric pressure, with hot gaseous medium having a temperature, within the range about from 120° to 220° F., insufficiently high to cause the foam to substantially decrease in volume and continuing said contact of the hot gaseous medium with the foam until the foam is dehydrated to a solid, porous, readily dispersible product.

References Cited in the file of this patent

UNITED STATES PATENTS

| | | |
|---|---|---|
| 312,342 | Duryea | Feb. 17, 1885 |
| 1,079,669 | Steltmann | Nov. 25, 1913 |
| 1,146,965 | Sleeper | July 20, 1915 |
| 1,653,390 | Coltman | Dec. 20, 1927 |
| 1,735,397 | Hiller | Nov. 12, 1929 |
| 2,010,902 | Stephansen | Aug. 13, 1935 |
| 2,257,531 | Pebbles | Sept. 30, 1941 |
| 2,561,394 | Marshall | July 24, 1951 |
| 2,785,077 | Kaufman | Mar. 12, 1957 |
| 2,818,917 | Vincent | Jan. 7, 1958 |
| 2,854,343 | Strashun et al. | Sept. 30, 1958 |
| 2,858,226 | Kaufman | Oct. 28, 1958 |
| 2,955,046 | Morgan et al. | Oct. 4, 1960 |
| 2,955,943 | Morgan et al. | Oct. 11, 1960 |

OTHER REFERENCES

J. W. McCutcheon: "Soap & Chemical Specialities," July 1955, pages 50–61, call No. TP/991A1S6.